United States Patent [11] 3,612,227

[72] Inventors Erich Schaftner
Stuttgart-Zuffenhausen, Germany;
Giorgio Eggstein, Ospedaletti, San Remo, Italy; Heinz Ungerer, Stuttgart-Zuffenhausen, Germany
[21] Appl. No. 850,955
[22] Filed Aug. 18, 1969
[45] Patented Oct. 12, 1971
[73] Assignee Ernst Heinkel Aktiengesellschaft
Stuttgart-Zuffenhausen, Germany
[32] Priority Aug. 16, 1968
[33] Austria
[31] 8A8044/68

[54] DISK BRAKE CONSTRUCTION
7 Claims, 4 Drawing Figs.
[52] U.S. Cl.................................................. 188/73.3, 188/73.6
[51] Int. Cl..................................................... F16d 65/02
[50] Field of Search............................................ 188/72.1, 72.4, 73.3, 73.4, 73.5, 73.6

[56] References Cited
UNITED STATES PATENTS
3,384,203 5/1968 Walther et al. ............... 188/73.4
3,387,687 6/1968 Eggstein et al................ 188/73.3 X
3,388,774 6/1968 Burnett ....................... 188/73.5

Primary Examiner—George E. A. Halvosa
Attorney—Michael S. Striker

ABSTRACT: A disk brake comprises a rotor disk mounted for rotation about a predetermined axis. A mounting element straddles a section of the periphery of the rotor disk and has at opposite sides of the same a pair of cutouts aligned axially of the rotor disk and each extending indirection inwardly of the periphery. The cutouts each have opposite side faces at opposite sides of the axis. A presser element for friction pads also straddles the section of the periphery and has portions located at opposite axial sides of the rotor disk, each of which extends into one of the cutouts. Yieldable-retaining means retains the presser element yieldable but with freedom of displacement both axially and radially outwardly relative to the rotor disk. Cooperating slide surfaces is provided on the portions of the presser element and on the side faces, respectively, for enabling sliding displacement of the presser element axially of the rotor disk. Anticontaminant means prevents the entry of contaminants between the respective slide surfaces.

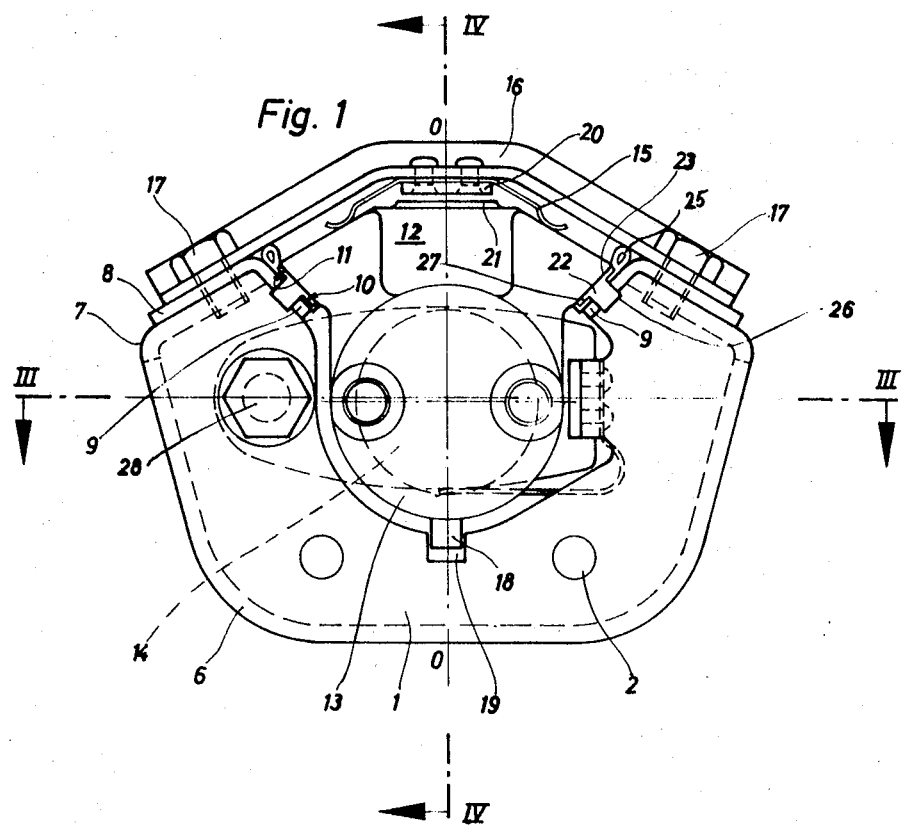
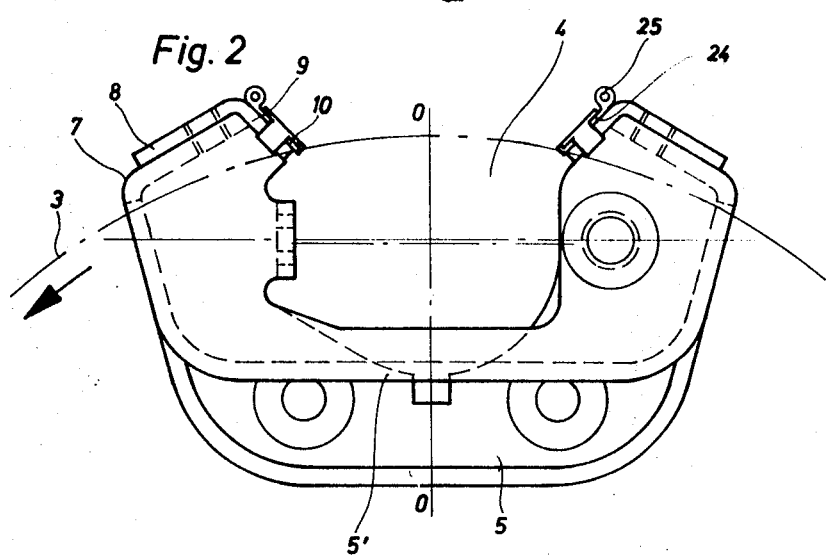

INVENTORS:
ERICH SCHAFTNER
GIORGIO EGGSTEIN
HEINZ UNGERER

BY

ATTORNEY 3,612,227

DISK BRAKE CONSTRUCTION

CROSS-REFERENCE TO RELATED APPLICATION

A related application, also entitled "Disk Brake Construction," was filed on June 17, 1969, in the name of Giorgio Eggstein et al., and is copending under Ser. No. 833,997.

BACKGROUND OF THE INVENTION

The present invention relates to disk brakes in general, and more particularly to disk brakes which advantageously can but need not exclusively be employed in automotive vehicles.

It is known to construct so-called "floating saddle disk brakes," and for detailed information concerning the construction of such disk brakes, reference may be had to the aforementioned copending application. It will suffice to point out herein that a substantially U-shaped member in these constructions straddles a section of the periphery of a rotor disk and is movable axially of the latter, with a single piston being provided which presses one friction pad against one side of the rotor disk, while the other friction pad provided is carried by that portion of the U-shaped member which is located at the other side of the rotor disk and which, as a result of the reaction movement performed by the U-shaped member when the piston is operated to press the one friction pad against one side of the rotor disk, is pressed against the other side of the same. Such disk brakes are in many ways preferably to the conventional type wherein the members straddling the periphery of the disk is stationary and two cylinders are provided at opposite axial sides of the disk, each of which urges an associated friction pad against the disk. In particular, the floating saddle disk brakes are considerably simpler in their construction than the conventional type, and are much less subject to mechanical difficulties. A further advantage is that in these floating saddle disk brakes, heat developing during operation of the brake is dissipated much more readily than in conventional disk brakes or, for that matter, than in drum brakes.

However, the floating saddle type of disk brake does suffer from a disadvantage, in that the U-shaped member is retained in its position by and performs sliding movements with reference to a mounting member which also straddles the periphery of the disk. The two members are provided with abutting slide surfaces which engage one another and it is these surfaces which at times prove troublesome. Difficulties in this respect arise from the fact that contaminants—such as dirt, water, and the like—can enter between these slide surfaces with the consequent difficulties which are so obvious that are not in need of discussion.

SUMMARY OF THE INVENTION

It is, therefore, an object of the present invention to provide a disk brake of the aforementioned type which is not possessed of these disadvantages.

More particularly, it is an object of the invention to provide such a disk brake wherein the entry of contaminants between the abutting slide surfaces on the members in question is reliably prevented.

A further object of the invention is to provide such a disk brake which is of simple construction, but highly reliable, and which can be readily serviced.

A concomitant object of the invention is to provide such a disk brake wherein the coefficient of friction between the abutting slide surfaces is and remains low.

In pursuance of these above objects, and others which will become apparent hereafter, one feature of my invention resides in a disk brake, particularly for automotive vehicles, which comprises a rotor disk mounted for rotation about a predetermined axis, and a mounting element which straddles a section of the periphery of this rotor disk and which has at opposite sides of the same a pair of cutouts aligned axially of the rotor disk and each extending in direction inwardly of the periphery. The cutouts each have opposite side faces at opposite sides of the axis.

A presser element for friction pads also straddles the section and has portions located at opposite axial sides of the rotor disk, with each such portion extending into one of the cutouts. Yieldable-retaining means yieldably retains the presser element with freedom of displacement both axially and radially outwardly relative to the rotor disk.

Cooperating slide surfaces on the aforementioned portions and on the side faces, respectively, permit sliding displacement of the presser element axially of the rotor disk.

Finally, we provide anticontaminant means which prevents the entry of contaminants between the respective slide surfaces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat diagrammatic side-elevational view of a brake according to the present invention;

FIG. 2 is a view similar to FIG. 1 but seen from the opposite side of the brake and with components omitted which are not essential for an understanding of the invention;

DESCRIPTION OF THE PREFERRED EMBODIMENTS

Figure 3:
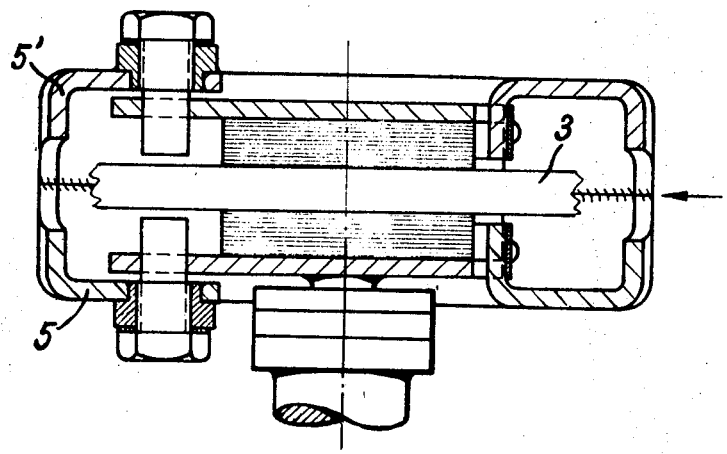
FIG. 3 is a section taken on the line III—III of FIG. 1.

Before entering into a detailed discussion of the drawing, it is pointed out that the illustration is of somewhat diagrammatic nature. Certain supporting components, such as fluid connections to the brake and portions of the vehicle body to which the brake is mounted, have been omitted for the sake of clarity. However, it is to be understood that the brake illustrated in the drawing is rigidly secured to a portion of the vehicle body via screws or bolts penetrating the bores which are identified with reference numeral 2 in FIG. 1.

Discussing now the drawing in detail, it will be seen that reference numeral 1 identifies a mounting element whose cross-sectional configuration is more clearly shown in FIG. 3 and which straddles, as shown above in FIGS. 2 and 3, a section of the periphery of the conventional rotor disk 3. The rotor disk 3 is only diagrammatically and in broken lines suggested in FIG. 2; it is mounted for rotation in the direction of the arrow of FIG. 2 about a predetermined axis in entirely conventional manner. Such rotor disks are already known in the art, and the manner in which the element 1 straddles a section of the periphery of the rotor disk 3, is also well known to those conversant with this field.

The element 1 may be but need not be composed of two shell-shaped portions 5,5'; it is so illustrated in the exemplary embodiments shown in the drawing. These shell-shaped portions may be advantageously pressed or stamped from sheet metal. Their juncture, which is located radially opposite the straddled section of the rotor disk periphery, is connected as by welding. The marginal zones 6 of the portions 5,5' are bent at right angles in direction inwardly towards the rotor 3, so as to extend axially of the same, as is evident from FIG. 1 for instance, to thereby provide stiffening and reinforcement of the element 1. Of course, this latter feature may be omitted or replaced with a different type of reinforcement.

The shell sections 5,5' are each provided with a substantially U-shaped cutout 4 which is open in radial direction of the rotor disk, that is to say in radially outward direction of the same. FIGS. 1 and 2 show this clearly. The outer edge faces of the element 1, along which the sections 5,5' abut and along which they are secured to one another, are identified with reference numeral 7. L-shaped sheet metal members 8 are provided which overlie the outer edge faces 7 with one of their arms and which are connected thereto in suitable manner, for instance by spot welding. The other arm 9 of each of the members 8 is bent inwardly so as to extend into the substantially U-shaped cutout, with the exposed surfaces 10 of the arms 9 being inclined towards one another and to the axis 0—0 of the rotor disk 3 (compare FIGS. 1 and 2) at an angle which in the illustrated embodiment is 45°.

Figure 4:
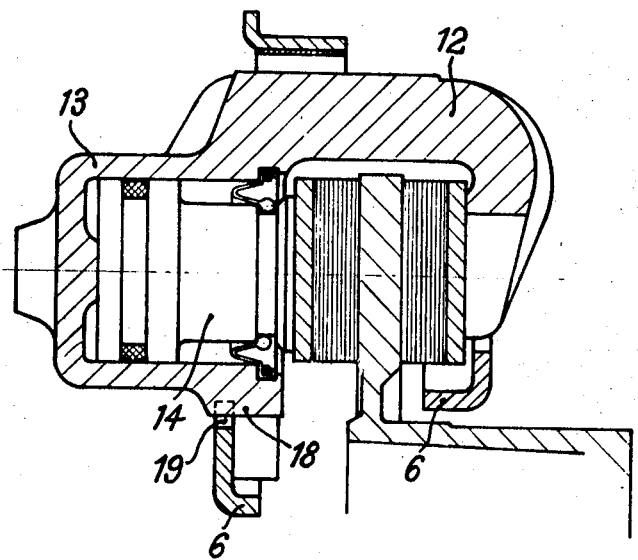
FIG. 4 is a section taken on the line IV—IV of FIG. 1.

A presser member 12 also straddles a section of the periphery of the rotor disk 3 within the confines of the cutouts; it constitutes the "floating saddle" known from prior art disk brakes of this type. A single cylinder 13 is provided and a piston 14 is slidable in the cylinder 13 on introduction of a pressure medium in conventional manner. The one arm or portion of the presser member 12 which is provided with the cylinder 13 is located at one axial side of the rotor disk 3, as seen in FIG. 4, and the other arm or portion of the presser member 12 is located at the opposite axial side of the rotor disk 3. Friction pads—illustrated, but not identified with reference numerals—are located intermediate the respective axial sides of the rotor disk 3 and the piston 14 on the one hand, and the other arm of the presser member 12 on the other hand. Bolts 28 are threaded into corresponding bores of the mounting element 1 and project in the direction axially towards the rotor disk 3. The friction pads are slidable on these bolts in the manner which is more fully described in detail in the aforementioned copending application.

The slide surfaces 10 on the arms 9 of the members 8 are each in abutment with a corresponding slide surface 11 provided on the presser member 12 in the manner illustrated and for the purpose outlined before, and more specifically detailed in the aforementioned copending application. A bracket extends above and bridges the mounting element 1 to which it is secured with screws 17 or analogous securing elements. The bracket 16 carries on its underside which faces the presser element 12 a biasing spring 15 whose configuration and operation is clearly evident from FIG. 1. It is clear that the spring 15 presses the member 12 into the respective U-shaped cutouts so that the slide surfaces 11 on the member 12 are in sliding abutment with the slide surfaces 10 on the member 1.

At the exterior of the cylinder 13 there is provided a projection 18 which extends into a corresponding groove 19 provided at the bottom of the cutouts 4. The purpose of this locating arrangement is to locate the members 1 and 12 with reference to one another and to prevent angular displacement of the member 12 if and when the latter should be displaced with respect to the member 1 in the sense in which the slide surfaces 10 and 11 move out of abutment with one another. This could occur on starting up or on operation of the brake if the same is iced. The provision of the portions 18 and 19 assures that aside from movement of the member 12 in direction normal to the plane of FIG. 1, the only other movement possible is in the direction of the axis 0—0.

To assure that the movement of the member 12 in the direction of the axis 0—0 is possible only within narrow limits, the bracket 16 is provided with an abutment plate 20 which is juxtaposed to a raised abutment surface 21 provided on the member 12 and which abutment surface moves into engagement with the plate 20 after the member 13 has undergone displacement in direction of the axis 0—0 and towards the bracket 16 by a predetermined distance corresponding to the spacing between the plate 20 and the surface 21.

The purpose of so limiting the movement of the member 12 in the direction of the axis 0—0 is to assure that no contaminants can enter between the abutting slide surfaces 10 and 11. In accordance with the invention, the slide surfaces 10 support guide members 22 of nonoxidizable material and whose exposed surfaces in turn constitute the actual slide surfaces in abutment with the slide surfaces 11 of the member 12. The guide members 22 are advantageously provided with bores or apertures which accommodate quantities of heat-resistant moisture-repellant grease. Many suitable lubricating greases are known for this purpose and serve, of course, to reduce the coefficient of friction between the slide surfaces 10 and 11 and to resist damage to these surfaces as a result of intruding moisture.

Interposed between the respective guide members 20 and the inclined side surfaces of the member 1 on which they are mounted, are members 24 of elastically yieldable material which are provided with resiliently compressible beads 25 at their edges which face towards and contact the bracket 16. These beads 25 are urged by contact with bracket 16 to sealingly engage—in every position of the member 12 with reference to the member 1 and even with the member 12 has moved along the axis 0—0 out of the respective cutouts by the maximum distance permitted before contact between the plate 20 and surface 21—the edges of the members 1 and 12 adjacent to and along the edges of the slide surfaces 10 and 11, so as to prevent the entry of contaminants between these slide surfaces even if the member 12 has been displaced to such an extent that the surface 21 abuts against the plate 20.

The guide members 22 may be provided with upstanding flanges extending normal to the plane of FIG. 1 laterally of the slide surfaces 10, 11, to provide further protection against contaminants. Furthermore, the slide surfaces 10 on the guide members 22 may be provided with recesses which extend normal to the plane of FIG. 1 and are so configurated as to slidably accommodate the slide surfaces 11 therein. At the opposite ends—as seen with respect to the axis of rotation of the rotor disk 3—the guide members 22 are provided with portions 26 embracing the respectively associated member 24 of elastically yieldable material and the marginal zone 6 of the member 1. When the respective guide members 22 are mounted on the member 1, they are pressed tightly against the associated member 24 whereby the latter is compressed, and thereupon the projecting portions 26 are bent over to retain the guide members 22 and the associated members 24 firmly in place.

The appearance of the guide members 22 and associated members 24 of elastically yieldable material—which material may be elastomeric such as natural or synthetic rubber, or the like—is believed to be clearly evident from the various Figures.

It will be understood that each of the elements described above, or two or more together, may also find a useful application in other types of constructions differing from the types described above.

While the invention has been illustrated and described as embodied in a disk brake construction, it is not intended to be limited to the details shown, since various modifications and structural changes may be made without departing in any way from the spirit of the present invention.

What is claimed as new and desired to be protected by Letters Patent is set forth in the appended claims.

1. In a disk brake, particularly for automotive vehicles, a combination comprising a rotor disk mounted for rotation about a predetermined axis; a mounting element straddling a section of the periphery of said rotor disk and having at opposite sides of the same a pair of substantially U-shaped cutouts aligned axially of said rotor disk and each extending in direction inwardly of said periphery, said cutouts each having a bottom face provided with a notch extending in direction of said axis and opposite side faces at opposite sides of said axis; a presser element for friction pads also straddling said section and having portions located at opposite axial sides of said rotor disk and each extending into one of said cutouts and having a projection received in the respective notch; yieldable retaining means yieldably retaining said presser element with freedom of displacement both axially and radially outwardly relative to said rotor disk; cooperating slide surfaces on said portions and on said side faces, respectively, for enabling sliding displacement of said presser element axially of said rotor disk; and anticontaminant means for preventing the entry of contaminants between the respective slide surfaces, including strip members of elastically yieldable material interposed between the respective guide members and the associated side faces and each having at least one compressible bead elongated in direction of said axis and sealingly engaging said mounting element and said presser element along the edges of said slide surfaces in any relative position of said elements.

2. In a disk brake as defined in claim 1; and further comprising guide members provided on and overlying said opposite side faces, said guide members having respective exposed surfaces constituting said slide surfaces on said side faces.

3. In a disk brake as defined in claim 2, wherein said guide member consists at least at said exposed surfaces of nonoxidizable material.

4. In a disk brake as defined in claim 2, said exposed surfaces being provided with guide recesses elongated in direction axially of said rotor disk and being configurated for accommodating the respectively associated slide surfaces with freedom of displacement in said direction.

5. In a disk brake as defined in claim 2, said guide members having portions embracing marginal zones of said strip members of elastically yieldable material and said mounting element in the region of said side faces.

6. In a disk brake as defined in claim 2, said guide members being provided with apertures extending inwardly of said slide surfaces; and further comprising lubricating means received in said apertures.

7. In a disk brake as defined in claim 6, said lubricating means comprising quantities of heat-resistant, moisture-repelling grease.